United States Patent
Wit et al.

(10) Patent No.: US 8,374,980 B2
(45) Date of Patent: Feb. 12, 2013

(54) SYSTEM AND METHOD FOR MANAGING CONTINUED ATTENTION TO DISTANCE-LEARNING CONTENT

(75) Inventors: David Wit, Larchmont, NY (US); Adam Stein, Jersey City, NJ (US); Larry Plasil, Wyckoff, NJ (US); Jim Barako, Glen Rock, NJ (US)

(73) Assignee: Micron Systems, Glen Rock, NY (US)

( * ) Notice: Subject to any disclaimer, the term of this patent is extended or adjusted under 35 U.S.C. 154(b) by 427 days.

(21) Appl. No.: 12/853,624

(22) Filed: Aug. 10, 2010

(65) Prior Publication Data

US 2012/0041904 A1 Feb. 16, 2012

(51) Int. Cl.
 *G06N 5/00* (2006.01)
(52) U.S. Cl. .......................................... 706/12; 706/45
(58) Field of Classification Search ............... 706/12, 706/45
 See application file for complete search history.

(56) References Cited

PUBLICATIONS

Roberts, Computer-Supported Collaborative Learning in Higher Education, Idea Group Publishing, 2005, pp. 1-339.*

* cited by examiner

*Primary Examiner* — Wilbert L Starks
(74) *Attorney, Agent, or Firm* — Leason Ellis LLP

(57) ABSTRACT

Management of a user's continued attention to distance learning content using a general purpose computer having a central processing unit and an operating system configured to run multiple program applications concurrently. A memory stores the distance learning content. A distance learning module comprises code executable on the central processing unit, as one of the multiple program applications. The distance learning module presents the distance learning content to a user and is operable to interrupt a presentation of the distance learning content in response to prescribed events concerning another one of the multiple program applications. A method executing on a computer that an concurrently run multiple applications identifies events concerning an application other than the distance learning application, processes the identified events so as to identify a prescribed event among the identified events, and interrupts the presentation of the distance learning content in response to the prescribed event.

15 Claims, 5 Drawing Sheets

SYSTEM AND METHOD FOR MANAGING CONTINUED ATTENTION TO DISTANCE-LEARNING CONTENT

FIELD OF THE INVENTION

The present invention concerns management of distance learning and, more particularly, to a system and method for managing the presentation of distance learning content to a user on a computer and for doing so in relation to any prescribed events that may occur on the same computer during such presentation and thereby impact a user's attention to the presentation of the distance learning content.

BACKGROUND OF THE INVENTION

The field of delivering educational materials to students and professional who are not on site is referred to as "distance education" or "distance learning." One of the concerns in this field of education is to ensure that the participant is present while the course or seminar is being presented. This concern arises because there is no proctor on site while the educational material is being delivered. The concern is exacerbated, somewhat, by the fact that more and more participants are viewing distance learning content asynchronously within their home or office without any peers to encourage attention to the presented materials. In fact, more and more content is available to stream, download or otherwise play on a single machine on a time schedule that best suits each individual participant.

Traditionally, gauging the user's presence has been addressed by a challenge to the user to press a button or input a code into a telephone or computer to confirm presence at one or more times during or at the end of the program. While this approach ensures that the person is present, it does little to ensure that the user is paying attention during delivery of the distance learning content. As one extreme example, a course can be streamed to a computer while the user is reading and sending dozens of email messages, and, therefore, there can be great gaps in the attention given to the presented content.

Thus, while the user may be present, there have been no systems or methods developed to better ensure the user's continued attention to the distance learning content itself. Nor have any systems or methods been developed to monitor and respond to other actions taken by the participant concurrently during the presentation of distance learning content. The present invention addresses one or more of these and other problems in the art.

SUMMARY OF THE INVENTION

In accordance with one aspect of the invention, a system to facilitate management of a user's continued attention to distance learning content comprises a general purpose computer including a central processing unit and an operating system configured to run multiple program applications concurrently. A memory stores the distance learning content. A distance learning module comprises code executable on the central processing unit as one of the multiple program applications for presenting the distance learning content to a user. The module is operable to interrupt a presentation of the distance learning content in response to a prescribed event concerning another one of the multiple program applications.

In a further, optional aspect, the foregoing system resumes the presentation of the distance learning content after the prescribed event concerning the another one of the multiple program applications has ceased.

In accordance with another aspect of the invention, a system to facilitate management of a user's continued attention to distance learning content comprises a general purpose computer including a central processing unit and an operating system configured to run multiple program applications concurrently. A memory stores the distance learning content. A distance learning application comprises code executable on the central processing unit as one of the multiple program applications for presenting the distance learning content to a user. The application includes a plurality of modules executing on the central processing unit. An event module is operable to identify events concerning another one of the multiple program applications. An event processing module is operable to identify a prescribed event among the identified events. An action module is operable to interrupt a presentation of the distance learning content in response to the prescribed event.

In accordance with still another aspect of the invention, a method method for ensuring a user's continued attention to distance learning content is provided. A distance learning application is that presents distance learning content to the user on a display connected to a computer is executed. The computer has a central processing unit and an operating system configured to concurrently run multiple program applications other than the distance learning application. Events concerning one of the multiple program applications other than the distance learning application are identified using an event module executing in the processor. The identified events are processed so as to identify a prescribed event among the identified events using an event processing module executing in the processor. The presentation of the distance learning content on the display connected to the computer is interrupted in response to the prescribed event.

In a further, optional aspect, the foregoing method can include the additional step of resuming the presentation of the distance learning content on the display after the prescribed event concerning the one of the multiple program applications other than the distance learning application has ceased.

These and other features, aspects and advantages of the invention can be appreciated from the following Description of Certain Embodiments of the Invention and the accompanying Drawing Figures.

DESCRIPTION OF THE DRAWING FIGURES

DETAILED DESCRIPTION OF CERTAIN EMBODIMENTS OF THE INVENTION

By way of overview and introduction, the present invention is described in connection with a system and method for the presentation of a seminar in furtherance of satisfying a particular jurisdiction's requirements that an attorney has in regard to continuing legal education (CLE), as one specific implementation of a system and method in accordance with the invention. In the same implementation, additional or different features and functionalities can be provided to augment the functionality described herein that supports management of a user's continued attention to distance learning content. As can be appreciated, the same system and method described herein can be deployed with similar advantage to provide education and training to persons located anywhere, including content delivered for purposes other than CLE. A few non-limiting examples are CPD (foreign legal/accounting), CPE for accountants, CLE (already mentioned), and CME (medical). More generally, the system and method for managing distance learning can be applied in a myriad of sectors in which users have educational requirements to fulfill or regulatory licensing compliancy issues to satisfy, including, without limitation, in furtherance of teaching certification, network consultant certification, securities and insurance certification, medical training, engineering and so on.

Figure 1A:
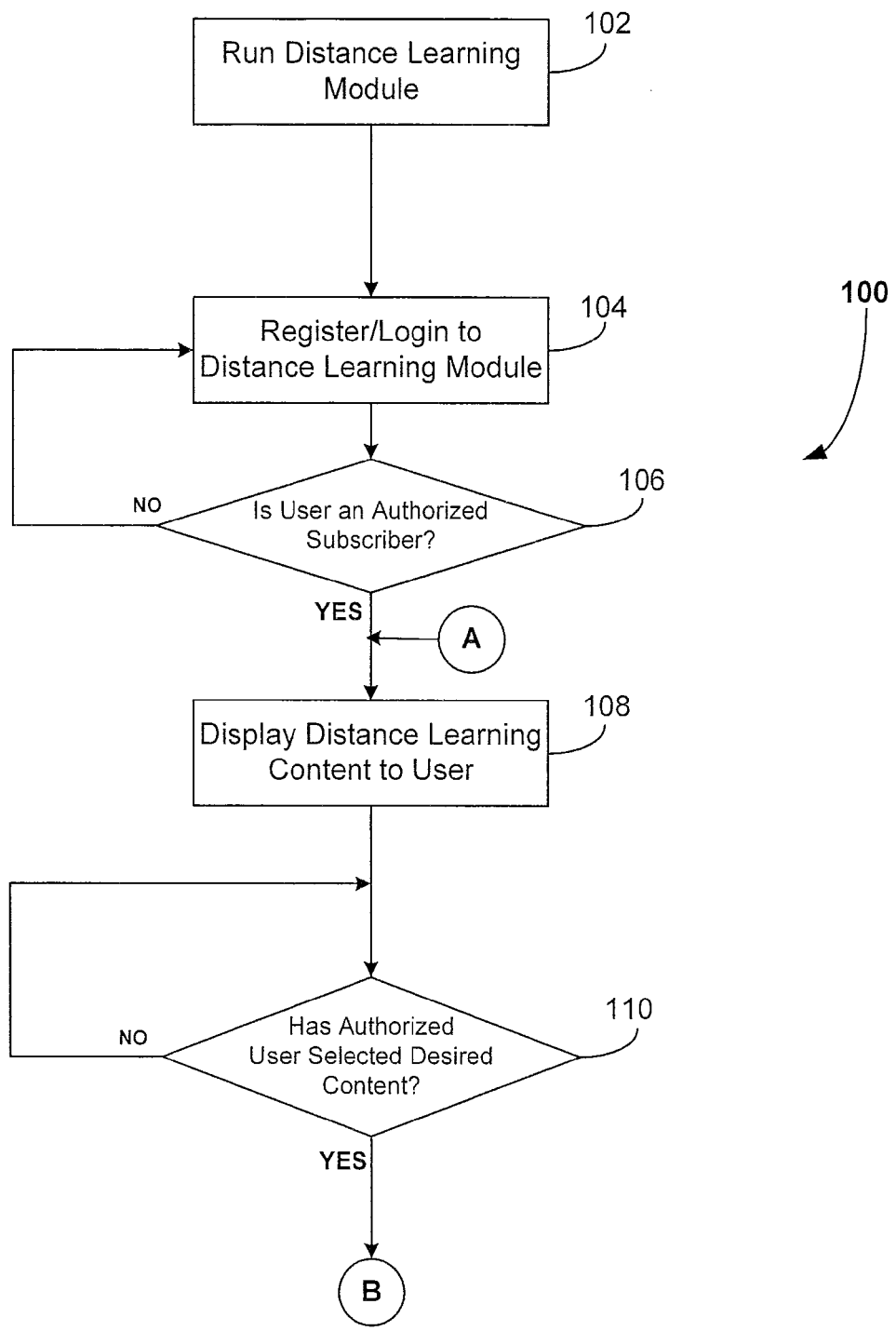
FIG. 1A is an operational flow 100 of an illustrative process implemented by a system that manages a user's attention to distance learning content according to one embodiment of the invention.
Figure 1B:
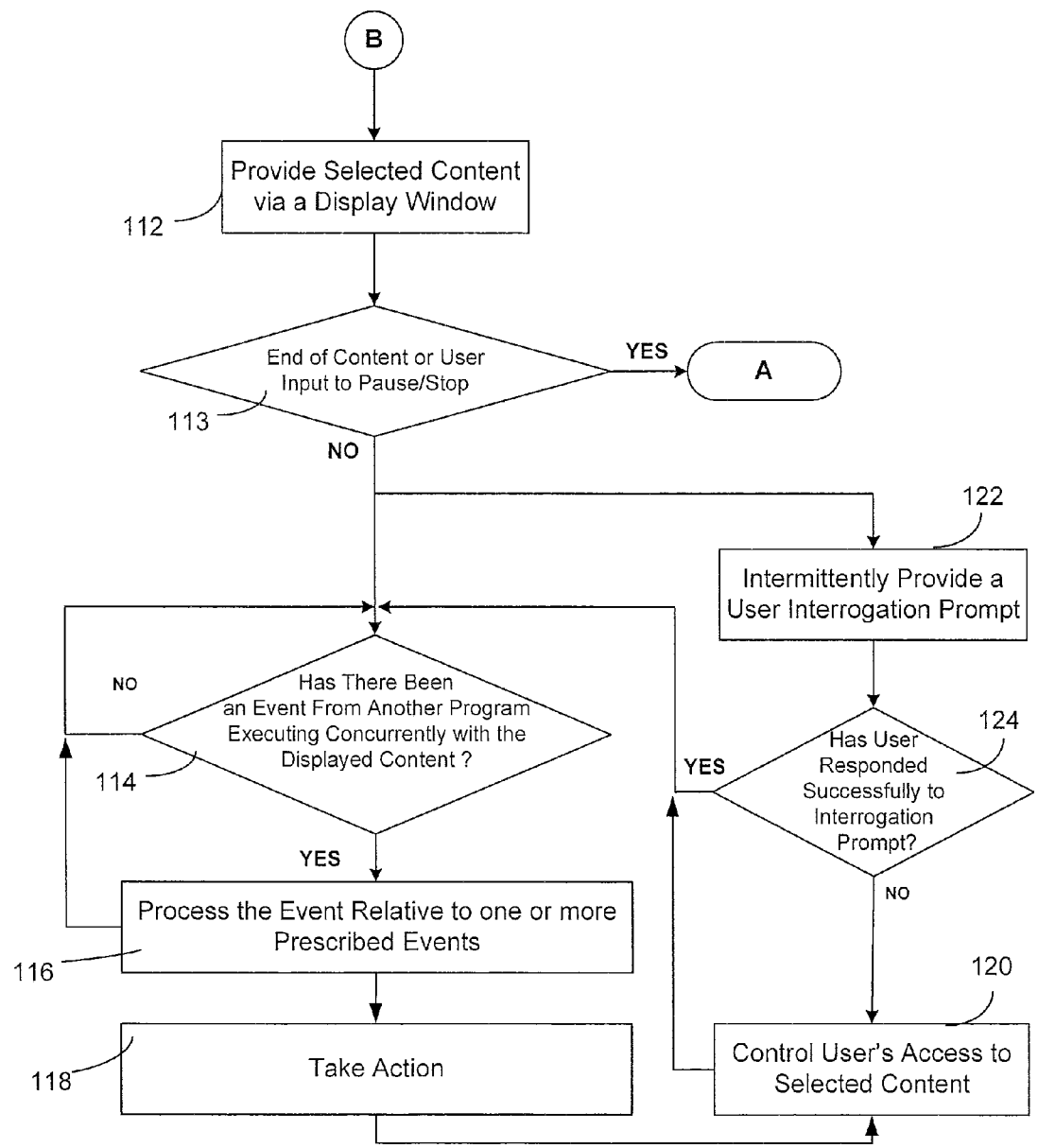
FIG. 1B is a continuation of the flow diagram of FIG. 1A, that starts after connector B at the bottom of FIG. 1A.

An operational flow 100 is shown in FIGS. 1A and 1B for an illustrative process implemented by a system that manages a user's attention to distance learning content. The flow 100 is one, non-limiting implementation of the attention-management functionality of the present invention. Distance learning content can take the form of any informational data from which a user receives an educational benefit. The informational data, for example, can include, as a non-limiting list of examples, video, audio, textual data that can be presented to the user through the auspices of a programmed computer, and SCORM compliant E-Learning, in one or more combinations. The distance learning content itself can vary widely. The content typically includes a visual portion that is presented to the user on a display associated with his or her computer, and can also include an audio portion that is played through speakers associated with his or her computer. The invention has utility both in regard to the distribution of streamed content to the user and in distance learning programs in which the content is distributed in advance of presentation to the user, such as by file transfer or as a result of providing discs and the like to the user.

Figure 1C:
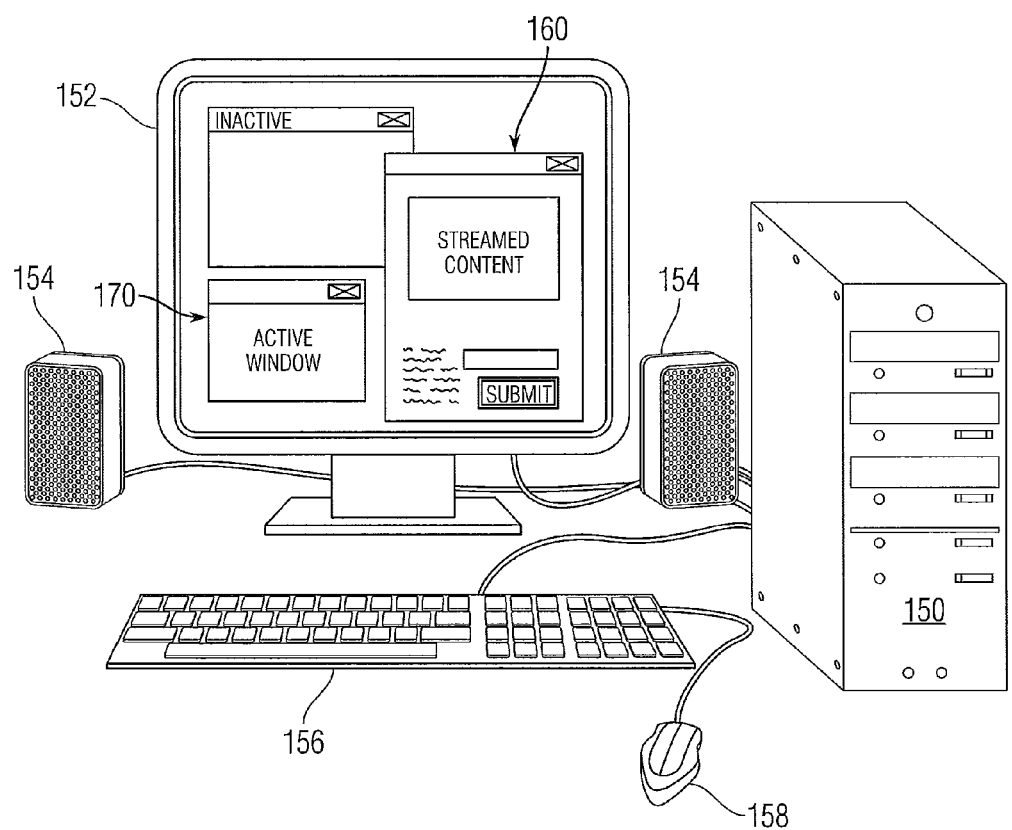
FIG. 1C is an image of an example presentation of distance learning content on a client machine that is being managed using a system and method in accordance with the invention.

The distance learning content can be presented to the user by any computer system (e.g., general purpose computer) having a memory capable of storing the distance learning content, and a processor capable of executing code for presenting the distance learning content to the user. In FIG. 1C, a client machine 150 that can be used by a user can comprise a conventional computer system, as described in further detail in connection with FIG. 3, which machine has a processor, memory, and a program that configures the processor. The client machine includes a video display such as a monitor 152, speakers 154, a keyboard 156 and a mouse 158 (each, more generally, being an input device), that together comprise a user interface.

The client machine 150 can be connected over a heterogeneous network to a content server in order to be provided with distance learning content (as discussed in detail herein), or the client machine 150 can obtain content locally through an attached drive, a connectable device, or through a local network.

Figure 2:
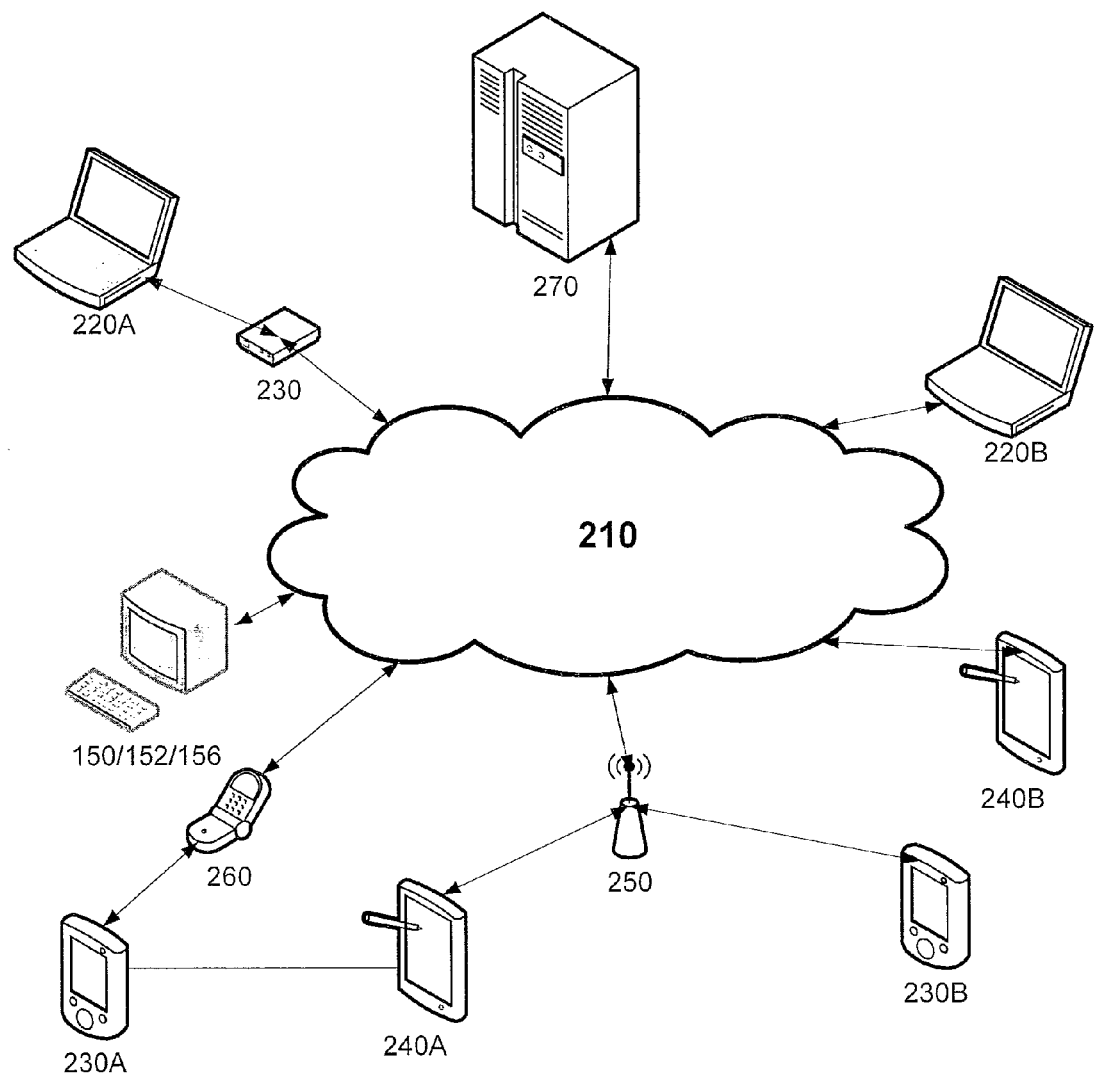
FIG. 2 is illustrates a network environment in which a system and method implementing an embodiment of the invention can be used.

In FIG. 2, multiple client machines such as client machine 150 can connect to server 270 over a network 210 using various communication mechanisms to receive distance learning content. For example, the client machine 150 can comprise a desktop machine that can connect to the network over an Ethernet or other broadband connection. Alternatively, the client machine can take on a different form and can connect in other ways. For instance, the client machine can comprise a laptop 220A and can connect to a modem 230 to access the server 270. Additionally, a variety of wireless networks can be utilized to facilitate client-server communications. Laptop 220B and tablet PC 240B (e.g., without limitation, an iPad from Apple Computer, Inc.) can connect via an internal cellular modem or PC Card cellular modem. Tablet PC 240A or Personal Digital Assistant (PDA) 230B can connect to a wireless access point 250 to communicate with server 270. Alternatively, PDA 230A can connect using a wireless standard such as Bluetooth or via a wired link to a cellular phone 260 that can communicate over the network 210 with the server 270. In some embodiments, the client machine can be implemented as a terminal that has the ability to present content (e.g., audio and visual) provided by a remotely executed program.

From the foregoing, it should be understood that the particular host machine that presents the e-learning content can vary widely and can include future technologies provided that it broadly is understood as including a general purpose computer of the type that has a central processing unit, an operating system configured to run multiple program applications concurrently, a memory that stores the distance learning content, and a distance learning module comprising code executable on the central processing unit as one of the multiple program applications.

The distance learning content can be transmitted to a user's computer system from a remote location where the content can reside. For example, a remote computer server 270 or remotely located storage system (not shown) can serve as the source for the distance learning content. Alternatively, the distance learning content can be provided locally, such as by accessing a DVD, a flash memory stick or other portable storage media connected locally to the user's computer system, from a local area network (LAN) to which the client machine may be connected, or from a database that is accessible to the client machine 150. For instance, some employers create content that can be distributed to employees and other individuals for distance-learning purposes, and in that case the content can be located on a segment of the employer's LAN, selected by a user, and presented in the same way as described herein for remotely-located content.

Figure 3:
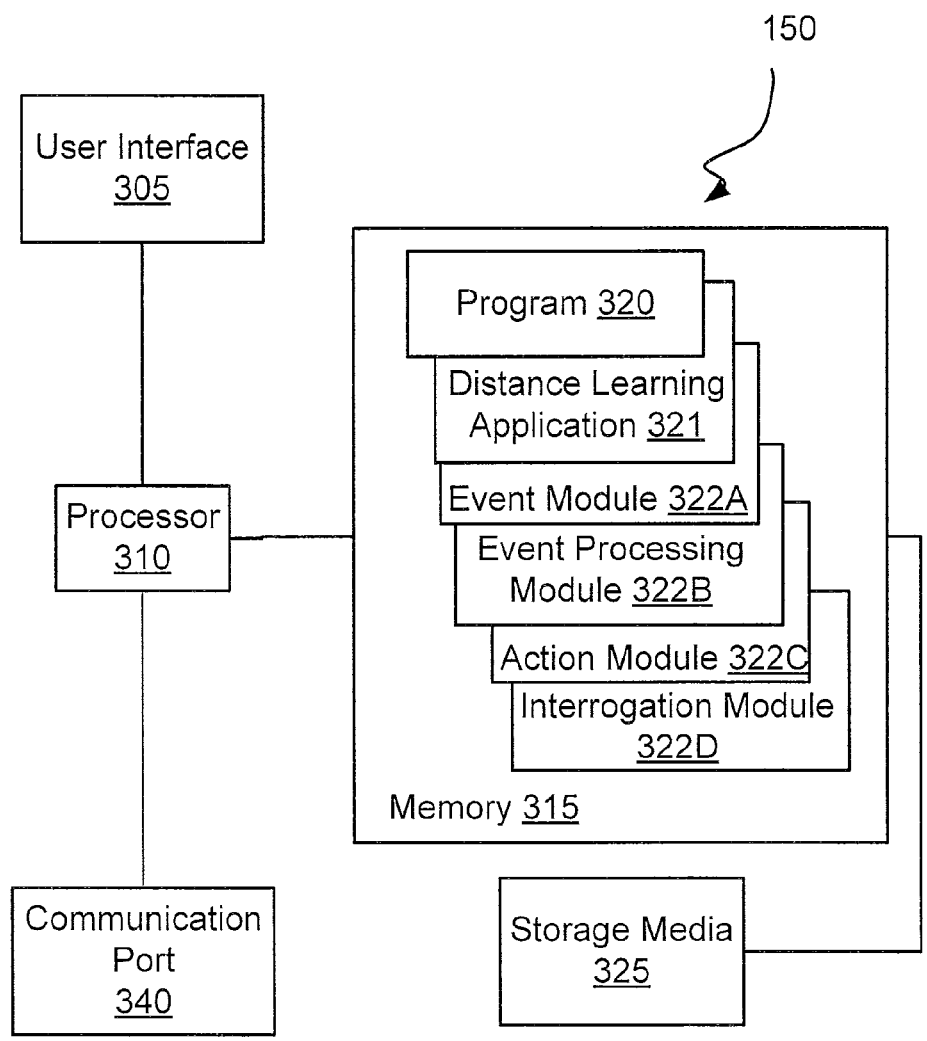
FIG. 3 illustrates a block diagram of a client machine configured to employ the system and methods described herein.

Referring briefly now to FIG. 3, a block diagram illustrates a client machine 150 configured for employment of the methods described herein. Client machine 150 includes a user interface 305, a processor 310, and a memory 315. Client machine 150 may be implemented on a general purpose microcomputer, such as one of the members of the Sun® Microsystems family of computer systems, one of the members of the IBM® Personal Computer family, one of the members of the Apple® Computer family, or a myriad other conventional workstation, desktop computer, laptop computer, netbook computer, personal digital assistant, and smart phone devices that are generally available in the marketplace. Although Client machine 150 is represented herein as a standalone system, it is not limited to such, but instead can be coupled to other computer systems via the network 210.

Memory 315 is a memory for storing data and instructions suitable for controlling the operation of processor 310. An implementation of memory 315 can include a random access memory (RAM), a hard drive and a read only memory (ROM). One of the components stored in memory 315 is a program 320.

Program 320 includes instructions for controlling processor 310 to execute the methods described herein. Program 320 may be implemented as a single module 322 or as a plurality of modules 322A, 322B, . . . 322N (where N is an arbitrary integer) that operate in cooperation with one another. Program 320 is contemplated as representing a software embodiment of the method described hereinabove. Each module 322 comprises code that executes within the processor 310 and configures the processor into a limited purpose machine suitable to the task of performing the functionality of such module 322. Also, portions of the program 320 can be implemented on different machines and communicate with each other throughout execution of the program. For example, some modules can execute on the client machine 150 while others execute on the server 270.

User interface 305 includes an input device, such as a keyboard 156, touch screen, tablet, or speech recognition subsystem for enabling a user to communicate information and command selections to the processor 310. The user interface 305 also includes an output device such as a display 152 or a printer. In the case of a touch screen, the input and output functions are provided by the same structure. A cursor control such as a mouse 158, track-ball, or joy stick, allows the user to manipulate a cursor on the display for communicating additional information and command selections to processor 310.

While program 320 is indicated as already loaded into memory 315, it may be configured on a storage media 325 for subsequent loading into memory 315. Storage media 325 can be any conventional storage media such as a magnetic tape, an optical storage media, a compact disc, or a floppy disc. Alternatively, storage media 325 can be a random access memory, or other type of electronic storage. The program can be stored and located on a remote storage system for provision to the memory 315 by way of the network 210 and the communication port 340.

In operation, the program 320 can take inputs from the memory 315 or from a remote data source. Also, the program can generate outputs through the user interface 305 or to a remote location via a communication port 340. The communication port can exchange messages and data using any number of conventional data transfer schemes and protocols.

According to at least one embodiment of the present invention, a distance learning management application or module 321 can be loaded onto and executed by the user's machine 150. The distance learning management application 321 is read from either the computer system's local memory 320 or downloaded from a remote source (e.g., database, server 270) communicatively coupled to the computer system (e.g., by way of the network 210). The application 321 is then executed as computer-readable code by the computer's central processing unit 310. The application or module 321 includes a player or can access a player on the client machine and operates to present the distance learning content to the user, such as through a web browser on the client machine 150. The application or module 321 further includes an event module 322A, an event processing module 322B, and an action module 322C, as described further below. The various modules cooperate with one another, passing information therebetween, as so as to effect the presentation of the distance learning content as a function of actions taken by the user in regard to other, concurrently executing programs in the client machine.

Upon execution of the distance learning management application 321, among other things, the event module 322A monitors whether a user is paying requisite attention to any distance learning content that is currently being presented to the user on the client machine 150. This monitoring is of particular significance when the user is required to receive educational credit by an accrediting agency for observing a particular educational program or course. For example, a user should not receive educational credit if they have not paid a certain level of attention to the generated content associated with a particular educational program or course. In the case of an attorney, for instance, an online three-credit CLE viewed on the user's computer can ordinarily be awarded regardless of whether the attorney was paying any attention to the content being displayed. Thus, in accordance with the present invention, the distance learning management application can monitor and manage any session in which distance learning content is being provided to a recipient-user in order to both monitor and facilitate events that establish whether a recipient-user is paying or has paid a requisite level of attention to such provided content.

Referring now to FIGS. 1A and 1B, details concerning the management of a user's attention to distance learning content is described. At step 102, the distance learning management application associated with the distance learning module is launched on the client machine 150 or on a machine that is otherwise controlling the presentation of content to the user. This can be a result of or coincident with, the selection of content from a content provider, such as server 270. Preferably, tests are performed from time to time to ensure that the management application is executing while the content is being presented at the client machine 150.

The user can be prompted to log in to the distance learning management application by entering a username and password (step 104). Typically, access to the content is restricted to subscribers and other authorized users. If it is the user's first time using the distance learning management application, the user can be required to complete a registration process prompted by user interactive screens (e.g., enter name/address, activation code, etc.) provided by the distance learning application (step 104). Upon completion of either the login or registration process, an optional step can be performed to determine whether the user is authorized to utilize the distance learning application (step 106). For example, if the distance learning application is programmed to execute over a predetermined period of time, the payment of additional subscription fees can be necessary. Under such circumstances, the user's login attempt will fail until such time as the payment of subscription fees is satisfied. Information concerning the logged-in user and the content that has been viewed are maintained, preferably by the server 270 and certification of the user's attendance and presence during one or more programs can be made to a regulatory or administrative agency. As can be appreciated, user's can be permitted access to content but the certification of the user's attendance and presence during one or more programs can be withheld until such time that the registration process has been completed or subscription fees have been paid.

Once the user is identified as an authorized subscriber, a selection of distance learning content can be displayed at the client machine (step 108). The user can now select a learning program or course to watch (step 110). Once the user has selected a learning program or course to watch, the selection is presented on the client machine (FIG. 1B, step 112). There are other actions that the user can take once logged-in, such as reviewing which courses have been taken so far, how many courses need to be completed before the close of a next compliance-window set by a jurisdiction that sets such requirements (e.g., a biennial CLE requirement window), and setting alerts that can inform the user of upcoming courses in areas of interest and various compliance deadlines. In short, the content provider can execute a management application (at its server) that can track the attorney's completed CLE credits while providing a notification to the user of further credits needed to comply with the attorney's overall CLE requirements. Compliance-standing can also apply to satisfying any particular educational program requirements. For example, compliance-standing requirements can be formulated by associations (e.g., the American Bar Association) or by companies to define an employee training program. Compliance-standing requirements can also take the form of regulatory-agency-based educational requirements. Thus, for example, an organization can be required to satisfy such regulatory-agency-based educational requirements.

Once selected (step 110), the selected distance learning program is provided to a window 160 on the user's computer display (step 112; see also FIG. 1C). For example, the distance learning management application 321 can display streaming audio/visual data within the window 160 corresponding to the selected distance learning program. In addition, the event module 322A executes to monitor whether (and which) other programs are running concurrently and generating events.

At this point in the process flow, the selected content is presented on the client machine until it has reached its end or is paused or stopped by the user (step 113). In such a case, the process flow loops back to FIG. 1A, step 108 to provide the user with an opportunity to select different content or take some other action, as previously described. Otherwise, the event module 322A executes, at step 114, to test whether other programs are running concurrently with the content presented in window 160 and are generating events. More specifically, the window 160 comprises a process or possibly an end-user application (e.g., an instance of a web browser) executing on the processor 310 of the client machine 150 which is necessary to the presentation of the distance learning content itself. However, there can be a plurality of other processes running on the processor, some of which are acted upon by the action module 322C to interrupt the presentation of the distance learning content to better ensure the user's continued attention to the content being presented, as described below.

The test at step 114 identifies whether there might be a basis to conclude that there are other processes that are competing for the user's attention while the distance learning content is being displayed in the window 160. The distance learning management application 321 takes the detected events and analyzes them (step 116) using the event processing module 322B to determine whether to take further action (step 118).

Preferably, the event processing module 322B excludes from its processing certain background processes that consume CPU usage yet otherwise comprise events. Such processes can be automatically identified upon launch of the application 321, can be identified in a configuration file, or can be identified based on a combination of both of these techniques. Background processes are those implemented by the client machine's system rather than by the applications that are run by the user himself or herself. Some examples include anti-virus programs, spyware detection programs, print spoolers, and other programs that can execute automatically and require minimal use of display-resources. As one example, a pop-up notification concerning the receipt of an email message as provided by the Outlook email client application made available by Microsoft Corporation, whether as a client application or a web-accessed, web-served version (i.e., Outlook Web Access). The application 321 can configure the event processing module 322B to ignore active processes that do no more than flash an icon on a tool bar or have a toast-like pop-up alert such as the pop-up just described. Each such background process that is identified at step 114 can be processed at step 116 as an ignore event. If the event is determined to be an ignore event, then the process flow can loop back to step 114 (the "NO" path) to detect further events.

Certain events may not qualify as background processes, but may be so short in duration as to not require further action by the event processing module 322B or the user. For instance, the event processing module 322B can initiate a timer in response to a window 170 opening. If the window is closed within a predetermined, short period of time (e.g., 5-10 seconds), then the event can be processed at step 116 as an ignorable event, and the process flow can again loop back to step 114 (the "NO" path) to detect further events. On the other hand, if the window 170 remains open, or is the active window, or both, for more than the predetermined period of time, the event can be processed as one that requires action by the action module 322C, at step 118.

Other events that can be detected at step 114 can comprise changes that are monitored by background processes yet which are related to the use of peripherals associated with the client machine (e.g., a telephone) rather than use of the client machine itself. Such events include, for instance, timers that are executed within the client machine 150 as a code thread to track use of a telephone. A process of this type can be identified in a configuration file or otherwise, and can be processed at step 116 by the event processing module 322B as an event that requires action by the action module 322C, even though it has no or minimal impact on the display 152.

There can be still other events that can be managed based on permissions or settings established for (or within) the application 321. For instance, certain content providers can provide content in an inactive window and that content can be processed either as a basis for taking action at step 118 or as an ignorable event. For example, certain websites such as YouTube can stream content to an inactive window, yet the presentation of a video from that site is not consistent with maintaining the user's continued attention to distance learning content that is being concurrently presented. The detection of a process executing in a displayed, yet inactive window can therefore be proscribed by taking action at step 118 using the action module 322C. On the other hand, some websites can have asynchronous data pushed to a window (such as stock quotes) and this type of concurrent program execution can be permitted as an ignorable event via a loop back to step 114. One or more proscribed sites can be logged in a file and referenced by the processing step 116 in connection with a determination as to whether action is to be taken or not based on any events associated with such sites. As such, the processing step manages events that can be represented as stored data within the distance learning application 321 itself, which can be updated by the distance learning management application provider (e.g., via software updates downloadable from a remote server).

For any event that is not excludable, the distance learning management application takes further action, at step 118. Actions can be implemented by the action module 322C which operates, among other ways, to interrupt the presentation of content by the application 321 in response to certain events associated with other programs running in the client machine, until the user takes action within the window 160 or otherwise interacts with the application 321 to confirm that the application has the user's attention. Once the user's attention has been confirmed, directly or indirectly, the presentation can resume. In part, the action module 322C can cause the following actions in response to an event processed by the event processing module 322B and determined to require action: a streamed video can be halted, including any accompanying audio tracks, until the user closes the other application or makes the window 160 the active window, or otherwise takes steps that interact with the client machine 150 to demonstrate that the user's attention is again being directed to the distance learning content. In part, the action taken by the action module 322C can include incrementing a counter to monitor the frequency or total number of actionable-events since the distance learning content was first presented to the user at step 108. In part, the action taken by the action module 322C can include a warning displayed to the user within the active window 160 or elsewhere that the distance learning content may be interrupted and the learning session possibly disqualified if the event is not ceased.

There are many events that are not-excludable that can result from a user interacting with a program while the distance learning content is being presented. For example, it would be inappropriate to ignore or otherwise exclude the user's interaction with an email client application. In other words, if the user is reading and responding to emails, or filing them away while the distance learning content is being presented, then his or her attention is divided and the application 321 can take action in view of the detection of such events that have been processed at step 116 as being actionable. The same is true if the user is typing at the keyboard, regardless of whether inputs are being provided to word processing program, an instant message client, a spreadsheet, or some other program. Preferably, a daemon executing in the processor 310 is configured to detect that the window 160 presenting the distance learning content is not currently the active window, and, in that case, any inputs using the keyboard 156 (or any other input device) trigger the application 321 to take action in response to the event after processing at step 116.

In addition to the actions taken at step 118, if the proscribed activity is not ceased after any warning or within the predetermined period of time, or if the proscribed activity has occurred a threshold number of times since the delivery of the distance learning content began at step 108, then the action module 322C takes control of the display of the selected content (step 120). For example, under such circumstances, the action module 322C can terminate the presentation of the selected distance learning content, thereby forcing the user to re-launch the selected content from the beginning. Alternatively, for example, the action module 322C can pause the transmission and presentation of the selected content, thereby prompting the user to shut-down the process that prompted the event detected at step 114 prior to resuming playback of the selected content. These events can impact whether the viewer obtains credit for viewing the content, and can require the user to restart the presentation in order to obtain credit or certification that he or she participated in the learning session.

In addition to monitoring events, according to some embodiments, the distance learning management application can also, intermittently (e.g., regular or irregular intervals), generate validation prompts to interrogate a user in order to establish whether the user is paying attention to the selected content being displayed (step 122). For example, while the user is viewing the selected content, a validation prompt window can pop up on the user's display screen. The validation prompt window can ask the user to enter a particular number (e.g., a unique code) displayed to the user within the prompt window. Such a prompt can be provided by an interrogation module 322D. Responses are captured as evidence of the user's presence during delivery of the distance learning content. According to another example, the user can be prompted to enter a string of words or a unique password known to the user. In either case, the distance learning management application determines whether the user has successfully responded to the requests of the prompt window (step 124). A successful response can constitute the user entering a correct response to the prompt window within a predetermined time following the display of the prompt window.

If the user fails to respond to the validation prompt window within, say, 30 seconds, the distance learning management application 321, e.g., using the action module 322C, can take control of the display of the selected content (step 120). Also, the distance learning management application can take control of the display of the selected content (step 120) if the user fails to enter a correct number or string after repeated attempts (e.g., three attempts). As previously described, by taking control of the display of the selected content (step 120), the distance learning management application can force certain outcomes, depending on the settings established by a firm administrator. One outcome of failing the interrogation is to require the user to re-launch a particular distance learning program in order to earn any credit.

A missed interrogation prompt need not be flagged to the user, at least in accordance with one possible administrative setting of the distance learning program. If the user misses the prompt, he or she can be disqualified from earning credit for the course unless the omission is cured. If the user realizes or is informed that he or she missed a validation prompt, the user can revert to the point of the last good validation and continue again from that point in the distance learning program in order to qualify for credit. On the other hand, if the firm, via the administrative settings, does not allow users to rectify themselves from the last good validation, other outcome possibilities include the requirement for administrative interjection in order to override the user's omission and qualify the user for credit, or the resetting of the user so that the program can be watched again from the beginning.

In more particular implementations, a system can include a configuration file that is managed by an administrator such as a trusted individual of an employer having multiple persons that are to use the distance learning application described herein. The configuration file can maintain relationships in a database among the users, their jurisdictions and other associations. For instance, the configuration file can maintain data concerning which states a lawyer is admitted to practice and his or her practice group within a firm, and any other groupings. Each user can augment his or her profile to inform the system of courses taken or credits earned outside of the system, and any other pertinent information.

The methods described herein have been indicated in connection with flow diagrams that facilitate a description of the principal processes; however, certain blocks can be invoked in an arbitrary order, such as when the events drive the program flow such as in an object-oriented program implementation. Accordingly, the flow diagrams are to be understood as example flows such that the blocks can be invoked in a different order than as illustrated.

While the invention has been described in connection with certain embodiments thereof, the invention is not limited to the described embodiments but rather is more broadly defined by the features recited in the claims below and equivalents of such features.

We claim:

1. A computer system to facilitate management of a user's continued attention to distance learning content, the system comprising:
   a general purpose computer including:
   a central processing unit and an operating system configured to run multiple program applications concurrently;
   a memory that stores the distance learning content; and a distance learning module comprising code executable on the central processing unit as one of the multiple program applications for presenting the distance learning content to a user and operable to interrupt a presentation of the distance learning content in response to a prescribed event concerning another one of the multiple program applications.

2. The system of claim 1, wherein the distance learning module is further operable to resume the presentation of the distance learning content, after the prescribed event concerning the another one of the multiple program applications has ceased, in response to interaction with a window presented by the distance learning module.

3. The system of claim 1, further comprising at least one database communicably attached to the general purpose computer.

4. The system of claim 3, wherein the distance learning module is further operable to provide notification regarding an employee's compliance-standing with continuing education requirements.

5. The system of claim 1, wherein the distance learning module is further operable to determine an employee's compliance-standing with continuing education requirements.

6. The system of claim 1, wherein the distance learning module is further operable to identify and manage employer identified relationships and associated continuing education requirements.

7. The system of claim 1, wherein the distance learning module is further operable to identify and manage continuing education content providers and associated continuing education requirements.

8. The system of claim 1, wherein the distance learning module is further operable to identify and manage continuing education accrediting agency identified relationships and associated continuing education requirements.

9. The system of claim 1, wherein the distance learning module is further operable to identify and manage employee identified relationships and associated continuing education requirements.

10. The system of claim 1, wherein the distance learning module is further operable to identify and manage regulatory agency identified relationships and associated continuing education requirements.

11. The system of claim 1, wherein the distance learning module is further operable to interrogate a user so and capture evidence of the user's attendance to the distance learning content.

12. The system of claim 1, wherein the distance learning module is further operable to provide unique codes to a user accessing the distance learning content to be recorded by a user to evidence the user's attendance to the distance learning content.

13. A computer system to facilitate management of a user's continued attention to distance learning content, the system comprising:
  a general purpose computer including:
  a central processing unit and an operating system configured to run multiple program applications concurrently;
  a memory that stores the distance learning content; and
  a distance learning application comprising code executable on the central processing unit as one of the multiple program applications for presenting the distance learning content to a user and including a plurality of modules executing on the central processing unit including an event module operable to identify events concerning another one of the multiple program applications, an event processing module operable to identify a prescribed event among the identified events, and an action module operable to interrupt a presentation of the distance learning content in response to the prescribed event.

14. A method for ensuring a user's continued attention to distance learning content, comprising the steps of:
  executing a distance learning application that presents distance learning content to the user on a display connected to a computer, the computer having a central processing unit, and an operating system configured to concurrently run multiple program applications other than the distance learning application;
  identifying events concerning one of the multiple program applications other than the distance learning application using an event module executing in the processor;
  processing the identified events so as to identify a prescribed event among the identified events using an event processing module executing in the processor, and
  interrupting the presentation of the distance learning content on the display connected to the computer in response to the prescribed event.

15. The method of claim 14, further comprising the step of resuming the presentation of the distance learning content on the display connected to the computer after the prescribed event concerning the one of the multiple program applications other than the distance learning application has ceased.

* * * * *